Sept. 30, 1952         G. B. WARSAW         2,612,128
SOLDERING TOOL FOR TUBE SOCKETS AND TERMINAL STRIPS
Filed Feb. 23, 1951
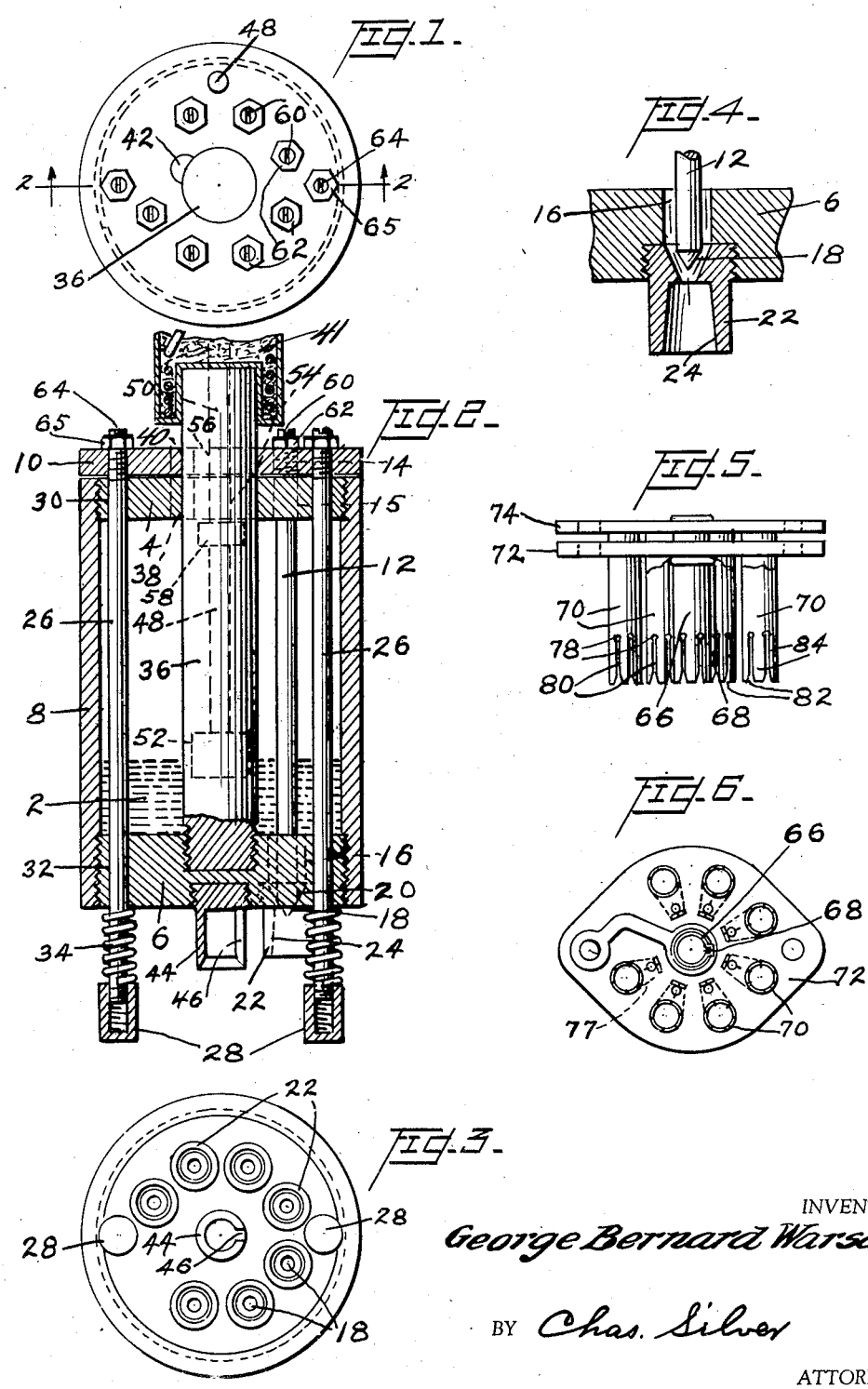
INVENTOR
*George Bernard Warsaw,*
BY *Chas. Silver*
ATTORNEY Patented Sept. 30, 1952

2,612,128

UNITED STATES PATENT OFFICE 2,612,128

SOLDERING TOOL FOR TUBE SOCKETS AND TERMINAL STRIPS

George Bernard Warsaw, Los Angeles, Calif.

Application February 23, 1951, Serial No. 212,430

4 Claims. (Cl. 113—59)

This invention relates to soldering devices and has particular reference to a soldering tool whereby the soldering of wires to the plurality of prongs of a terminal strip or female electronic tube socket may be effected simultaneously.

In the electronic sockets heretofore in use, for example, the sockets employed in radio and television chassis, each and every wire to be connected to the tube prong must be passed through a hole in a lug or ear of the tube prong, then crimped and finally soldered with the conventional soldering tool. This individual soldering of each wire is a tedious and time-consuming operation and entails considerable expense where a large number of wires are joined in this way to the sockets. In many cases, the solder drips off the prong un-noticed by the solderer or by the assembler of the radio or television set, with consequent faulty and/or weak electrical connection.

Among the objects of this invention is the production of a soldering tool whereby the foregoing objections incident to the soldering of wires to prior sockets are overcome and whereby all of the wires to be joined to their respective prongs in the socket are soldered securely, firmly, neatly and simultaneously at a very low cost and single operation.

More specifically, it is an object of this invention to provide a novel soldering tool for use on my novel terminal strips or female electronic tube sockets forming the subject matter of my co-pending application, Serial Number 212,429, filed on even date herewith.

Other, further and more specific objects of this invention will become readily apparent to persons skilled in the art from a consideration of the following description when taken in conjunction with the accompanying drawing wherein:

Fig. 1 is a top plan view of a preferred form of my novel soldering tool.

Fig. 2 is a vertical section along line 2—2 of Fig. 1.

Fig. 3 is a bottom plan view of the device shown in Fig. 1.

Fig. 4 is an enlarged, fragmental section of the soldering outlet of the tool shown in Fig. 1, with the valve in open position.

Fig. 5 is a front elevation, with parts broken away, of a terminal strip or female electronic tube socket for which my novel soldering is particularly adapted.

Fig. 6 is a bottom plan view of the socket shown in Fig. 5.

For my novel soldering tool, I provide a solder reservoir 2 having the cover plate 4 and base plate 6 threadedly fastened to the cylindrical wall 8. The operating plate 10 disposed over plate 4 supports a plurality of valve rods 12 which are threaded at 14 in plate 10 and pass through bores 15 in plate 4 and into the bores 16 in plate 6. The inner extremity 18 of each valve rod is conical and rests on the conical seat 20 of the adapter 22 when the valve is in the closed position as shown in Fig. 2. Each valve has its corresponding adapter which is threadedly secured to the bottom of base plate 6 and has the tapered inner wall 24.

The operating rods 26 have one end threadedly engaging and passing through operating plate 10 and the other end threaded into the foot or pedestal 28. These rods 26 also pass through the bores 30 in cover plate 4 and bores 32 in base plate 6. These bores 30 and 32, as well as bores 15 in plate 4, have adequate clearance to permit easy sliding therein of the operating rods 26 and valve rods 12. Closely fitting coil springs 34 are placed on the rods 26 and bear against the bottom of base plate 6 and the top of the respective pedestal 28.

The soldering copper rod 36, threaded into the top of base plate 6 projects through the bore 38 in cover plate 4 and bore 40 in operating plate 10 and is connected with any suitable regulated electric heater 41. The bores 38 and 40 are provided with slight clearance for easy sliding of the copper rod 36 and are further enlarged at 42 to permit insertion of solder into the reservoir 2. The adapter 44 is threaded into the bottom of base plate 6 and has the longitudinal slot 46 for receiving the key of the pilot prong of the socket, as will be later described.

For indication of the level of the molten solder in the reservoir 2, I provide the guage 48 which has the indicating rod 50 fastened to the float 52 and passing through the bore 54 in cover plate and bore 56 in operating plate 10. The stop 58 on rod 50 limits its upward movement.

Each valve rod 12 has the slot or notch 60, which admit of their adjustment by a screw driver, and the nut 62 locks the rod in the adjusted position. The slot or notch 64 in each spacing rod 26 and the nuts 65 thereon serve similar purposes. Operating rods 26 may also be adjusted at their pedestals 28.

In the terminal strip or female electronic tube socket shown in Figs. 5 and 6, an inner pilot prong 66 having the key 68 is surrounded by a plurality of socket prongs 70. The spaced insulator plates 72 and 74 support and hold prongs 66 and 70 in place. The female socket prongs 70 have the bores 76 in their bottom plates 77 for receiving the male prongs of an electronic tube inserted in the socket. The prongs 66 and 70 have wire receiving bores 78 and slots 80 continuing therefrom and preferably terminate in the V-shaped notches 82 for readily receiving wires to be soldered thereto. The prongs may be of any suitable conducting metal but I prefer to use tinned brass therefor, the metal having sufficient thickness and rigidity to provide a slight spring tension and thus permit the yielding of the extended portions 84 when my soldering tool is placed over the prongs preliminary to the soldering operation.

In operation of my novel soldering tool the copper rod 36 is heated to operating temperature by applying electric current. Wire solder is inserted in the bore enlargement 42 and placed against the heated copper rod 36. The solder melts and flows down into the reservoir 2. As the solder level rises, the guage 48 rises until arrested when the stop 58 contacts the bottom of cover plate 4, but the solder level can rise further although the indicator is prevented from moving higher.

After the reservoir 2 has been filled with sufficient molten solder, the soldering tool is positioned over the socket to be soldered so that the adapter 44 is aligned over the pilot prong 66 and then rotated to bring the key 68 in registry with the longitudinal slot 46 of adapter 44 and thereby also bringing the adapters 22 in proper alignment with the socket prongs 70. The soldering tool is then forced down all the way, first causing pilot prong 66 to enter the adapter 44 while the key 68 partially enters slot 46 and then socket prongs 70 are forced into the adapters or tapered valve outlets 22. As the soldering tool is being forced down, the reservoir 2 will serve as a plunger acting against the springs 34 and will move away from operating plate 10 which holds the valve rods 12, thereby opening the valve to a position, as shown in Fig. 4. This will permit the molten solder to run through the valve and into the socket prongs 70. The bottom plates 77 of these prongs 70 serve to hold the molten solder therein and the snug fit of the extended portions 84 as they are compressed by the tapered walls 24 of the adapters 22 also prevents leakage of the molten solder. When all of these sockets are filled with solder, the soldering tool is raised and withdrawn from the sockets. During this withdrawal, the springs 34 will force the reservoir 2 toward operating plate 10, thereby forcing the valve rods 12 to their seats and closing the valves and thus cut off the flow of solder. The foregoing operation is repeated with other sockets to be soldered until the solder level in the reservoir drops too low, as will be shown by the guage 48.

When the solder solidifies in the socket prongs 70, all wires that were within these socket prongs when the molten metal entered will become securely, firmly, effectively and neatly bonded to the prongs by the filler of solder in the prongs.

With my novel soldering tool, the soldering of the wires to the sockets may be done before the sockets are affixed to the chassis, as in the manufacture of sub-assemblies. My novel device has the further advantage that the soldering operation therein may be carried out after the sockets have been affixed to the chassis and also after other accessories have been connected to the chassis.

The present invention is not limited to the specific details set forth in the foregoing examples which should be construed as illustrative and not by way of limitation and, in view of the numerous modifications which may be effected therein without departing from the spirit and scope of this invention, it is desired that only such limitations be imposed as are indicated in the appended claims.

I claim as my invention:

1. In a tool for soldering terminal strips and sockets, a plurality of upright rods fastened to pedestal supports at one end and to a valve rod supporter at the other end, a spring mounted on each upright rod and resting on the pedestal, a reservoir slidably mounted on said upright rods and resting on said springs, a central pilot-receiving adapter and a plurality of surrounding socket prong-receiving adapters extending from the base of said reservoir, said pilot-receiving adapter having a slot for engaging the key of a pilot prong and each socket prong-receiving adapter having a tapering solder outlet adapted to receive a socket prong for soldering same and a conical valve seat extending upwardly from said solder outlet, a plurality of valve rods connected to said valve rod supporter and projecting therefrom into said reservoir; the terminal of each valve rod being conical and adapted to rest on its respective seat when said reservoir is in the uppermost position relative to said valve rod supporter and to separate from its valve seat when said reservoir is pushed against the tension of said springs from said uppermost position, a heat-receiving copper connected to the base of said reservoir, extending from said base through said reservoir, and projecting from said reservoir; an inlet for solder to said reservoir and a guage for showing the level of solder in said reservoir.

2. In a tool for soldering terminal strips and sockets, a plurality of uprights fastened to pedestal supports at one end and to a valve rod supporter at the other end, a spring mounted on each upright and resting on the pedestal, a reservoir slidably mounted on said uprights and resting on said springs, an inner pilot-receiving adapter and a plurality of socket prong-receiving adapters extending from the base of said reservoir; said pilot-receiving adapter having a key slot and said socket prong-receiving adapters having solder outlets adapted to receive socket prongs for soldering same and valve seats extending from said solder outlets to the interior of said reservoir, a plurality of valve rods connected to said valve rod supporter and projecting therefrom into said reservoir; each valve rod being adapted to rest on its respective seat when said reservoir is in the uppermost position relative to said valve rod supporter and to separate from its valve seat when said reservoir is pushed against the tension of said springs from said uppermost position, a heat-receiving copper connected to the base of said reservoir and extending from said base through said reservoir, and projecting from said reservoir, an inlet for solder to said reservoir and a guage for showing the level of solder in said reservoir.

3. In a tool for soldering terminal strips and sockets, a plurality of uprights fastened to pedestal supports at one end and to a valve rod supporter at the other end, a spring mounted on each upright and resting on the pedestal, a reservoir slidably mounted on said uprights and resting on said springs, a pilot-receiving adapter and a plurality of socket prong-receiving adapters extending from the base of said reservoir, said pilot-receiving adapter having a key slot and said socket prong-receiving adapters having solder outlets adapted to receive socket prongs for soldering same and valve seats extending from said solder outlets to the interior of said reservoir, a plurality of valve rods connected to said valve rod supporter and projecting therefrom into said reservoir, each valve rod being adapted to rest on its respective seat when said reservoir is in the uppermost position relative to said valve rod supporter and to separate from its valve seat when said reservoir is pushed against the tension of said springs from said uppermost position, a heat-receiving copper in said reservoir, and an inlet for solder to said reservoir.

4. In a tool for soldering terminal strips and sockets, a plurality of uprights fastened to pedestal supports at one end and to have a valve rod supporter at the other end, a spring mounted on each upright, a reservoir slidably mounted on said uprights and bearing against said springs, a pilot-receiving adapter and a plurality of socket prong-receiving adapters extending from the base of said reservoir, said pilot-receiving adapter having a key slot and said socket prong-receiving adapters having solder outlets adapted to receive socket prongs for soldering same and valve seats extending from said solder outlets to the interior of said reservoir, a plurality of valve rods connected to said valve rod supporter and projecting therefrom into said reservoir, each valve rod being adapted to rest on its respective seat when said reservoir is in the uppermost position relative to said valve rod supporter and to separate from its valve seat when said reservoir is pushed against the tension of said springs from said uppermost position, a heat-receiving copper in said reservoir, and an inlet for solder to said reservoir.

GEORGE BERNARD WARSAW.

REFERENCES CITED

The following references are of record in the file of this patent:

UNITED STATES PATENTS

| Number | Name | Date |
|---|---|---|
| 1,214,420 | Bradley | Jan. 30, 1917 |
| 1,322,559 | Gethman | Nov. 25, 1919 |
| 2,293,455 | Disch | Aug. 23, 1942 |